(12) United States Patent
Sella et al.

(10) Patent No.: US 11,373,797 B2
(45) Date of Patent: Jun. 28, 2022

(54) ALTERNATING CURRENT NEUTRAL AND GROUND INDUCTIVE ELECTROMAGNETIC RECTIFICATION APPARATUS

(71) Applicant: LINE LOSS PRO LLC, Henderson, NV (US)

(72) Inventors: Robert Carmine Mario Sella, Saint Petersburg, FL (US); Ricardo Alexandre de Freitas, Itajai, SC (US)

(73) Assignee: Line Loss Pro LLC, St. Petersburg, FL (US)

( * ) Notice: Subject to any disclaimer, the term of this patent is extended or adjusted under 35 U.S.C. 154(b) by 713 days.

(21) Appl. No.: 16/154,370

(22) Filed: Oct. 8, 2018

(65) Prior Publication Data

US 2019/0326051 A1 Oct. 24, 2019

(51) Int. Cl.
*H01F 27/30* (2006.01)
*H01F 27/32* (2006.01)
*H02J 3/01* (2006.01)
*H01F 27/02* (2006.01)

(52) U.S. Cl.
CPC ......... *H01F 27/327* (2013.01); *H01F 27/022* (2013.01); *H02J 3/01* (2013.01)

(58) Field of Classification Search
CPC .............................. H01F 27/327; H01F 27/022
USPC ........................................ 336/207, 216, 128
See application file for complete search history.

(56) References Cited

U.S. PATENT DOCUMENTS

| | | | |
|---|---|---|---|
| 4,288,772 A * | 9/1981 | MacBeth | H01F 27/125 174/15.1 |
| 4,870,555 A | 9/1989 | White | |
| 5,148,359 A | 9/1992 | Nguyen | |
| 5,371,466 A * | 12/1994 | Arakawa | G01R 33/3685 324/318 |
| 5,574,356 A | 11/1996 | Parker | |
| 5,576,942 A | 11/1996 | Beverly et al. | |
| 5,734,563 A | 3/1998 | Shinada | |
| 6,043,997 A | 3/2000 | He et al. | |
| 6,794,929 B2 | 9/2004 | Pelly | |
| 7,948,342 B2 | 5/2011 | Long | |
| 8,471,514 B2 | 6/2013 | Zargari | |
| 8,674,544 B2 | 3/2014 | Rada et al. | |
| 10,163,562 B2 * | 12/2018 | Fu | H02M 7/493 |
| 2003/0214313 A1 * | 11/2003 | Omura | G01R 31/2884 324/713 |

(Continued)

*Primary Examiner* — Ronald Hinson

(57) ABSTRACT

An alternating current neutral and ground inductive electromagnetic rectification unit includes a first and second reactor connectable to a neutral and a ground of an existing circuit respectively. The first redactor includes a first pair of inductive coils, each coil disposed interior to a nonconductive tube. The second redactor includes a second pair of inductive coils, each coil also disposed interior to a nonconductive tube. The first pair of inductive coils are connected together in parallel, and also connected at opposing extremes terminating the neutral. The second pair of inductive coils are also connected in parallel, at opposing extremes of the ground. The first and second redactors are surrounded by an insulating matrix set within the housing. Once connected to the ground and neutral, the first and second redactors establish a magnetic field that redacts harmonic interference emerging on the neutral thereby increasing efficiency and power factor across the circuit.

11 Claims, 3 Drawing Sheets

(56) References Cited

U.S. PATENT DOCUMENTS

| | | | |
|---|---|---|---|
| 2008/0001693 A1* | 1/2008 | Hahn | H01F 30/12 336/83 |
| 2008/0266042 A1 | 10/2008 | Koshimura et al. | |
| 2009/0230776 A1* | 9/2009 | Ochi | H01F 30/12 307/83 |
| 2010/0090789 A1* | 4/2010 | Schluter | H01F 30/10 336/192 |
| 2011/0116212 A1 | 5/2011 | Rosemore et al. | |
| 2014/0265955 A1 | 9/2014 | Garlow et al. | |

* cited by examiner

ALTERNATING CURRENT NEUTRAL AND GROUND INDUCTIVE ELECTROMAGNETIC RECTIFICATION APPARATUS

CROSS-REFERENCE TO RELATED APPLICATIONS

This nonprovisional application claims the benefit of foreign filing BR2020180081689 filed in Brazil on Apr. 24, 2018, under 35 USC 119

FEDERALLY SPONSORED RESEARCH OR DEVELOPMENT

Not Applicable

INCORPORATION BY REFERENCE OF MATERIAL SUBMITTED ON A COMPACT DISK

Not Applicable

TO ALL WHOM IT MAY CONCERN

Be it known that I, Robert Carmine Mario Sella, a citizen of the United States, have invented new and useful improvements in an alternating current neutral and ground inductive electromagnetic rectification unit as described in this specification.

BACKGROUND OF THE INVENTION

In electrical systems employing alternating current, three phase power is commonplace due to several advantages three phase power enables. Three phase power provides three phases, each 120° apart, and cycled to enable constant torque and constant power. Further, the three phases can theoretically be ran along a neutral to deconstructively interfere and cancel each other out without the need of returning power to the generator to reroute or ground.

However, during daily usage of appliances connecting in circuit to draw loads from the electrical system, thereby impacting the phased power supplied, harmonic distortions frequently arise. Odd order harmonics do not fully add to zero when the three phases are interfered. Instead, odd order harmonics constructively resonate between the phases leading to an oscillating current borne to the neutral. Typically Delta connections are used to cycle the current around the connection instead of combining into the neutral wire of a Wye connection. However, total harmonic distortion ("THD") nonetheless arises in domestic and commercial circuits, reducing efficiency and decreasing performance and life of electronics suffering harmonic distortion through their circuitry.

Single phase power is likewise subject to harmonic distortion as appliances connecting to the circuit draw power to set up oscillations in at last parts of the general circuit feeding the appliances. Some of these oscillations interfere constructively with the phased power creating harmonics on the neutral.

What is needed is an alternating current neutral and ground inductive electromagnetic rectification unit devised to establish a magnetic field that attenuates and cancels out harmonic distortion off the neutral to restore phase and polarity to the to current and thereby increase efficiency, power factor output, and lifespan of connected electronics operating from the circuit in a process referred to herein as "redaction".

FIELD OF THE INVENTION

The present invention relates to an alternating current neutral and ground inductive electromagnetic rectification unit

SUMMARY OF THE INVENTION

The term "redactor", as herein applied, refers to a coil assembly having a pair of coils spaced-apart interior to an insulating matrix and connected in parallel to each other and thence to a circuit's neutral or ground, as case may be. The term "redactor" applies, as to the particular coil assemblies herein contemplated, therefore to the instant inventive step, whereby a magnetic field is arisen by each said redactor connected in circuit to a phased power source of alternating current, said magnetic field thereby established and maintained to cancel out odd order harmonics that otherwise constructively interfere in circuitry where three-phase power is consumed.

The adjective term of art coined for the process each redactor enables in establishing and maintaining a magnetic field used to attenuate odd order harmonics is herein enumerated as redactive. Thus a redactor is said to be redactive and to operate redactively. The noun-form for the process enumerated is therefore coined, redaction.

The present invention, therefore, provides a means for the redaction of odd order harmonics by interference with a magnetic field arisen and established by a pair of redactors.

Harmonics arise in circuitry where alternating current is phased and new loads draw from the circuit to create harmonic distortion in the phases. While even order harmonics typically cancel each other out at the neutral, odd order harmonics may constructively interfere and persist as oscillations on the neutral, taxing electronic appliances, producing heat, and diminishing power factor from the circuit in general. The result is that efficiency in power consumption is reduced and end users pay for power (sometimes as high as 25% of power consumed) that they do not in fact use. Further, the lifespan of electronics is markedly decreased as harmonic distortion operates through hardware across the circuit creating heat and distortion in sensitive components not designed to withstand harmonic distortion and the irregularity of current exacerbated therein.

The present alternating current neutral and ground inductive electromagnetic rectification unit, therefore, connects to the circuit at the neutral and ground of the circuit and is directly installable at the electrical panel of a residential or commercial building as a single installable unit. The present alternating current neutral and ground electromagnetic rectification unit, therefore, operates at the mains, on the cold side of the panel, and rectifies current supplied through the panel in question to redact odd order harmonics from the circuit to increase power factor and efficiency of power consumption off the circuit.

The present alternating current neutral and ground inductive electromagnetic rectification unit is installable by connection directly to the neutral and ground at the building electrical panel. A first redactor is connected to the neutral by connection of each of a pair of tail wires at either extreme terminating the neutral. A second redactor is connected in like manner to the ground. Magnetic fields established by each of said first and second redactor upon installation deconstructively interfere with harmonic distortion determinable at the neutral. The first and second redactors therefore redact the harmonic distortion from the current, maintaining proper polarity and phase off the mains.

The instant alternating current neutral and ground inductive electromagnetic rectification unit, therefore, includes a housing wherein each of the first and second redactor are disposed. The first redactor, interior to the housing, includes a first pair of inductive coils, each having at least thirteen to fourteen turns. Each of the first pair of inductive coils is disposed interior to a nonconductive tube and sealed therein by nonconductive end caps that endwise enclose the nonconductive tube. The end caps accommodate only a head wire and a tail wire therethrough. Each of the first pair of inductive coils is connected together by each respective head wire. Each of the first pair of inductive coils is connected to the neutral by each respective tail wire at opposite extremes terminating the neutral.

The second redactor is substantially identical to the first redactor, and therefore includes a second pair of inductive coils, each consisting of thirteen to fourteen turns, disposed interior to a nonconductive tube, and sealed therein by end caps that accommodate only each of a head wire and a tail wire therethrough respectively. In like manner as evinced with respect to the first pair of inductive coils comprising the first redactor, each of the second pair of inductive coils is connected together by each respective head wire. Each of the second pair of inductive coils is connected at either extreme terminating the ground.

Thus the pair of first inductive coils is connected in parallel to opposite extremes terminating the neutral and the second pair of inductive coils is connected in parallel to opposite extremes terminating the ground. All other live lines connected to the neutral or the ground are therefore disposed between the tail wires of either the first redactor or second redactor, as case may be (with the exception of the panel output ground).

Each of the first and second redactor are further surrounded by a set, nonconductive matrix that fills the interior of the housing encapsulating each of the first redactor and second redactor completely. Each tail wire, therefore, is disposed to connect to the respective neutral or ground exterior to the housing proper. Thus each redactor positions inductive coils interior to insulators whereby charge is established between nodes of conductivity. Mutual capacitance between the inductive coils is therefore potentiated and a magnetic field is established when current is applied through the redactors by connection in circuit. Redacted current is thereby admitted through to the neutral and ground.

The housing may further include an independent ground, connecting the housing proper to the panel ground in conjunction with the panel output ground.

Thus has been broadly outlined the more important features of the present alternating current neutral and ground inductive electromagnetic rectification unit so that the detailed description thereof that follows may be better understood and in order that the present contribution to the art may be better appreciated.

Objects of the present alternating current neutral and ground inductive electromagnetic rectification unit, along with various novel features that characterize the invention are particularly pointed out in the claims forming a part of this disclosure. For better understanding of the alternating current neutral and ground inductive electromagnetic rectification unit, its operating advantages and specific objects attained by its uses, refer to the accompanying drawings and description.

BRIEF DESCRIPTION OF THE DRAWINGS

FIGURES

Figure 1:
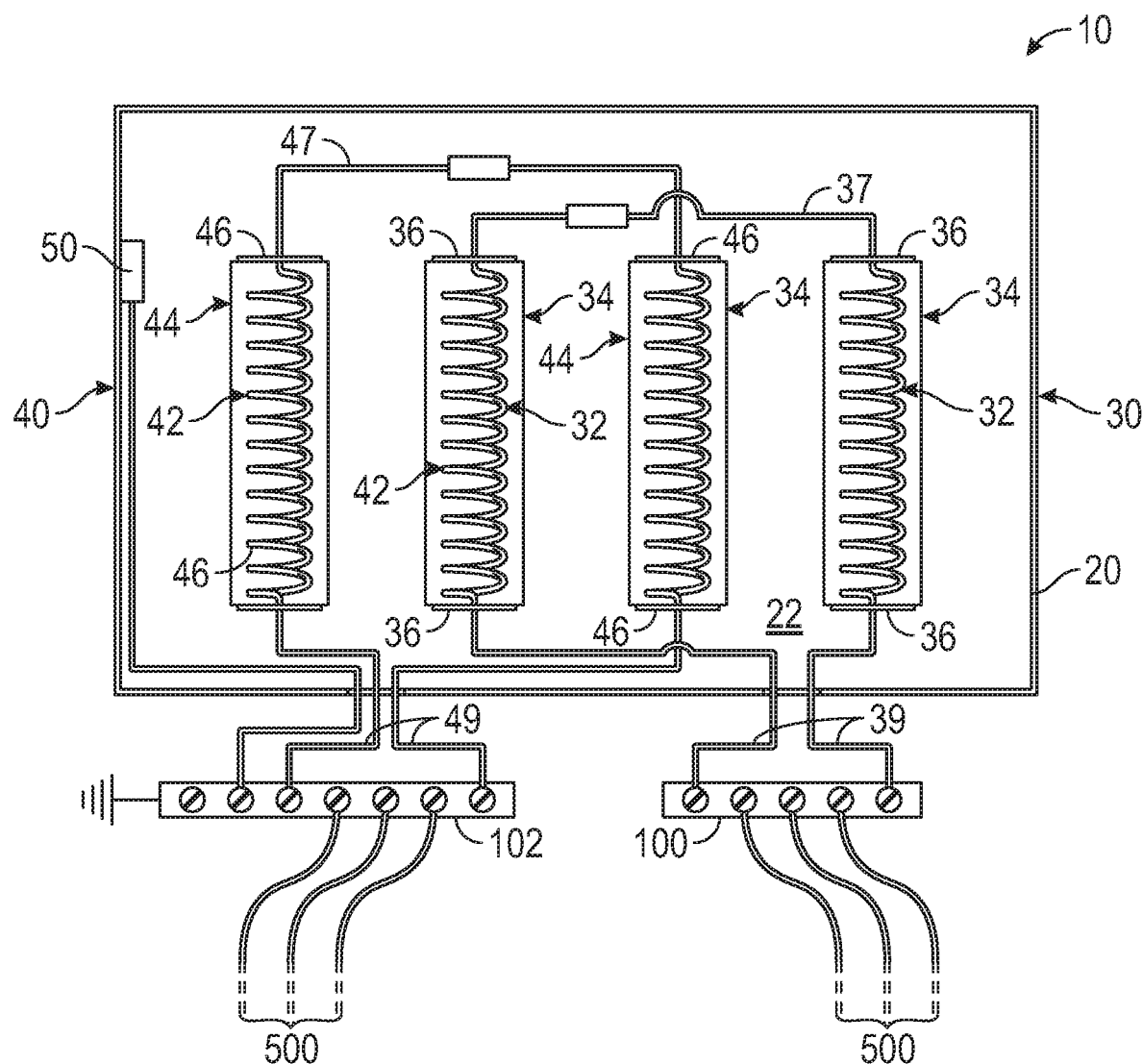

FIG. 1 is a diagrammatic view of an example embodiment.

Figure 2:
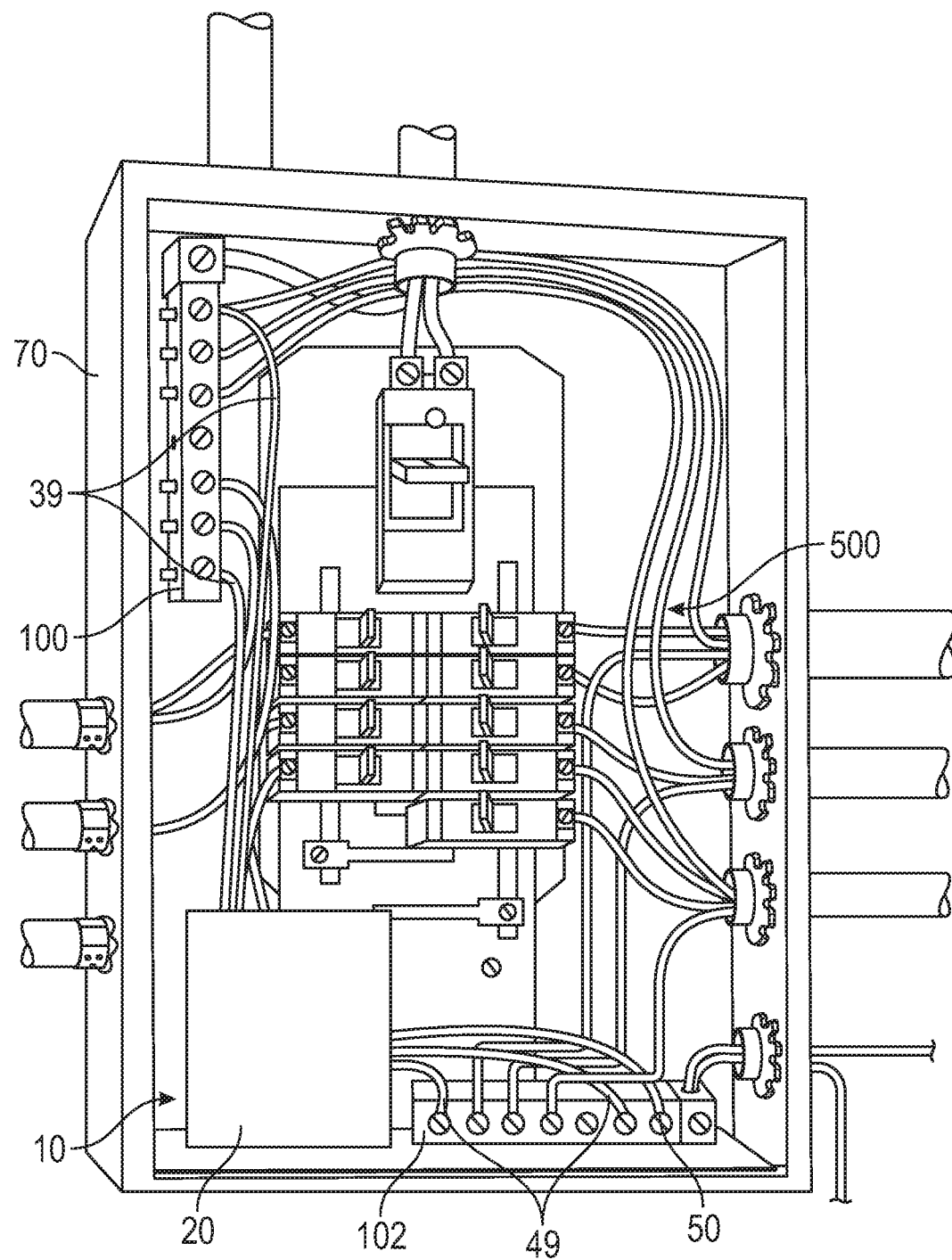

FIG. 2 is a front elevation view of an example embodiment installed into an electrical panel.

Figure 3:
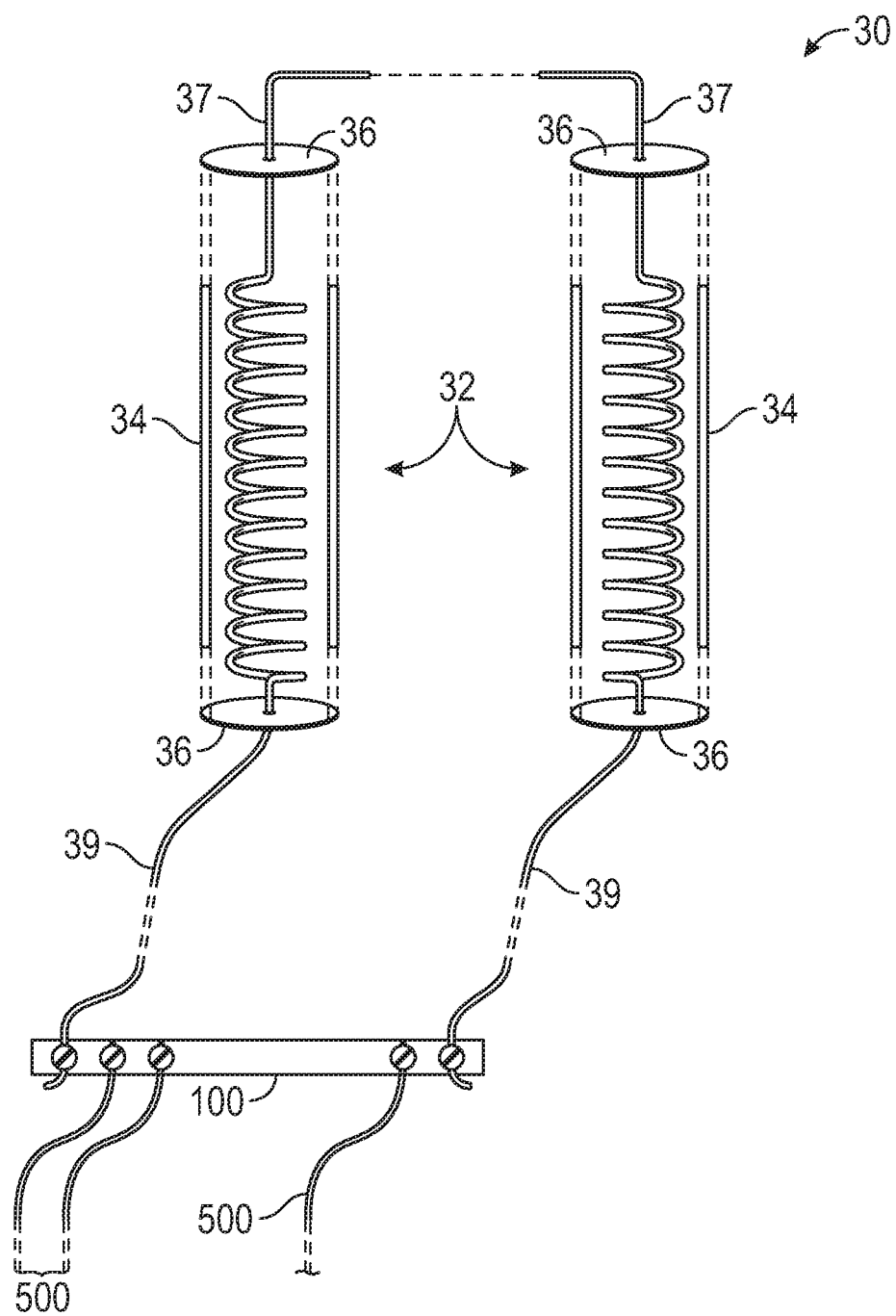

FIG. 3 is an exploded view of an example embodiment of a first redactor.

DETAILED DESCRIPTION OF THE DRAWINGS

With reference now to the drawings, and in particular FIGS. 1 through 3 thereof, example of the instant alternating current neutral and ground inductive electromagnetic rectification unit employing the principles and concepts of the present alternating current neutral and ground inductive electromagnetic rectification unit and generally designated by the reference number 10 will be described.

Referring to FIGS. 1 through 3 an example embodiment of the present alternating current neutral and ground inductive electromagnetic rectification unit 10 is illustrated.

As shown in FIGS. 1 and 2, the instant alternating current neutral and ground indicative electromagnetic rectification unit 10 has been devised to connect onto the cold side of a residential or commercial electrical panel 70, by connection to an existing neutral 100 and ground 102 of the said residential or commercial circuit 500. The instant alternating current neutral and ground inductive electromagnetic rectification unit 10 includes a durable, noncombustible housing 20. A first redactor 30 and a second redactor 40 are disposed interior to the housing 20 surrounded by an insulating matrix 22.

Referring to FIG. 1, the first redactor 30 includes a first pair of inductive coils 32 connected in parallel, each of said first pair of inductive coils 32 consisting of at least thirteen to fourteen turns. Each of the first pair of inductive coils 32 is disposed interior to a nonconductive tube 34. As shown in FIG. 3, each of said nonconductive tubes 34 has a pair of end caps 36 disposed endwise to sealably enclose either end of each said nonconductive tube 34. A respective head wire 37 and a respective tail wire 39 are accommodated through a respective end cap 36. The first pair of inductive coils 32 are connected together in parallel at each respective head wire 37. The tail wires 39 of the first pair of inductive coils 32 are connected to the circuit neutral 100 at opposing extremes terminating said neutral 100 interior to the electrical panel 70.

Referring again to FIG. 1, the second redactor 40 likewise includes a second pair of inductive coils 42 connected in parallel, each of said second pair of inductive coils 42 consisting of at least thirteen to fourteen turns disposed interior to a nonconductive tube 44. Each said nonconductive tube 44 also has a pair of end caps 46 disposed to sealably enclose either end of each said nonconductive tube 44 and to accommodate each of a head wire 47 and a tail wire 39 respectively therethrough. In like manner as the first pair of inductive coils 32, the second pair of inductive coils 42 is connected in parallel at each respective head wire 47. The tail wires 49 of the second pair of inductive coils 42 are connected at opposite extremes terminating the ground 102 of the circuit 500 interior to the electrical panel 70.

The insulating matrix 22 is disposed interior to the housing 20, preferably introduced to the housing 20 as a liquid to set as an insulating, nonconductive gel or solid surrounding the first and second redactors 30, 40. In the example embodiment depicted herein, the insulating matrix 22 is contemplated to be comprised of epoxy resin, set surrounding the first and second redactors 30, 40.

An independent ground 50, disposed upon the housing 20 and connectable to the circuit ground 102, is disposed interior to the housing 20 to serve as a redundant ground path for the first and second redactors 30, 40.

As shown in FIG. 2 the housing installs interior to an electrical panel 70 to the cold side of the circuit 500. Tail wires 39 and 49 are connected to the neutral 100 and ground 102 respectively. Once installed, the first and second redactors 30, 40 redact harmonics from the neutral 100 and restore polarity and phase to the current upon the circuit 500.

What is claimed is:

1. An alternating current neutral and ground inductive electromagnetic rectification unit comprising:
    a housing;
    a first redactor disposed interior to the housing, said first redactor comprising:
        a first pair of inductive coils connected in parallel, each of said first pair of inductive coils having at least thirteen to fourteen turns disposed interior to a nonconductive tube;
    a second redactor disposed interior to the housing, said second redactor comprising:
        a second pair of inductive coils connected in parallel, each of said second pair of inductive coils having at least thirteen to fourteen turns disposed interior to a nonconductive tube; and
    an insulating matrix disposed interior to the housing surrounding the first and second redactors;
    wherein the first redactor is further connected to a neutral and the second redactor is further connected to a ground whereby oscillations produced along the neutral due to the emergence of harmonics are reduced and total harmonic distortion is attenuated.

2. The alternating current neutral and ground inductive electromagnetic rectification unit of claim 1 wherein the first redactor is connected to terminals at either extreme of the neutral and the second redactor is connected to terminals at either extreme of the ground.

3. The alternating current neutral and ground inductive electromagnetic rectification to unit of claim 2 wherein the insulating matrix is epoxy resin.

4. The alternating current neutral and ground inductive electromagnetic rectification unit of claim 3 wherein the nonconductive tubes consist of electrical polyvinyl chloride pipes, each said pipe having nonconductive end caps sealing either end of each said pipe.

5. The alternating current neutral and ground inductive electromagnetic rectification unit of claim 4 further comprising an independent ground disposed upon the housing and connectable to the ground.

6. An alternating current neutral and ground inductive electromagnetic rectification unit comprising:
    a housing;
    a first redactor disposed interior to the housing, said first redactor comprising:
        a first pair of inductive coils connected in parallel, each of said first pair of inductive coils consisting of at least thirteen to fourteen turns disposed interior to a nonconductive tube, each nonconductive tube having a pair of end caps disposed endwise to sealably enclose either end of each said nonconductive tube and accommodate only each of a head wire and a tail wire respectively therethrough;
    a second redactor disposed interior to the housing, said second redactor comprising:
        a second pair of inductive coils connected in parallel, each of said second pair of inductive coils consisting of at least thirteen to fourteen turns disposed interior to a nonconductive tube, each said nonconductive tube having a pair of end caps disposed to sealably enclose either end of said nonconductive tube and accommodate only each of a head wire and a tail wire respectively therethrough; and
    an insulating matrix disposed interior to the housing and set surrounding the first and second redactors;
    wherein the first redactor is connected to a neutral and the second redactor is connected to a ground whereby oscillations produced along the neutral due to emergence of harmonics are reduced and total harmonic distortion is attenuated.

7. The alternating current neutral and ground inductive electromagnetic rectification unit of claim 6 wherein each of the first pair of coils comprising the first redactor is connected in parallel to each other by each respective head wire and each of the second pair of coils comprising the second redactor is connected in parallel to each other by each respective head wire.

8. The alternating current neutral and ground inductive electromagnetic rectification unit of claim 7 wherein each tail wire of the first redactor is connectable exteriorly to the housing at either extreme terminating the neutral.

9. The alternating current neutral and ground inductive electromagnetic rectification unit of claim 8 wherein each tail wire of the second redactor is connectable exteriorly to the housing at either extreme terminating the ground.

10. The alternating current neutral and ground inductive electromagnetic rectification unit of claim 9 further comprising an independent ground disposed upon the housing and connectable to the ground.

11. A method for attenuating harmonics from the neutral of an alternating current circuit, said method comprising the steps of:
    insulating each of a first pair of coils interior to a nonconductive tube and sealing each said tube with nonconductive end caps allowing only for a head wire and a tail wire to be accommodated through each respective end cap for connection into a circuit;
    connecting each of the first pair of coils' head wires together in parallel to create a first redactor;
    insulating each of a second pair of coils interior to a nonconductive tube and sealing each said tube with nonconductive end caps allowing only for a head wire and a tail wire to be accommodated through each respective end cap for connection into a circuit;
    connecting each of the second pair of coils' head wires together in parallel to create a second redactor;
    placing the first redactor and second redactor interior to a housing and surrounding said first and second redactors interior to the housing with a settable nonconductive matrix while maintaining each tail wire disposed for connection to a circuit exteriorly from the housing;
    connecting the tail wires of the first pair of coils to opposite extremes terminating a neutral; and
    connecting the tail wires of the second pair of coils to opposite extremes terminating a ground;

wherein harmonics arising and oscillating upon the wire are attenuated and canceled out by action of a magnetic field established by each of the first and second redactors.

\* \* \* \* \*